United States Patent
Amathnadu et al.

(10) Patent No.: US 9,746,927 B2
(45) Date of Patent: Aug. 29, 2017

(54) USER INTERFACE SYSTEM AND METHOD OF OPERATION THEREOF

(75) Inventors: Sheshadri Amathnadu, Santa Clara, CA (US); Adam Odessky, San Francisco, CA (US)

(73) Assignee: FRANCE TELECOM, Paris (FR)

( * ) Notice: Subject to any disclaimer, the term of this patent is extended or adjusted under 35 U.S.C. 154(b) by 0 days.

(21) Appl. No.: 13/876,922

(22) PCT Filed: Sep. 29, 2011

(86) PCT No.: PCT/IB2011/002821
§ 371 (c)(1),
(2), (4) Date: Jun. 25, 2013

(87) PCT Pub. No.: WO2012/042390
PCT Pub. Date: Apr. 5, 2012

(65) Prior Publication Data
US 2013/0307766 A1    Nov. 21, 2013

Related U.S. Application Data

(60) Provisional application No. 61/388,515, filed on Sep. 30, 2010.

(51) Int. Cl.
*G06F 3/01* (2006.01)
*G06K 9/00* (2006.01)

(52) U.S. Cl.
CPC ........ *G06F 3/017* (2013.01); *G06K 9/00355* (2013.01)

(58) Field of Classification Search
None
See application file for complete search history.

(56) References Cited

U.S. PATENT DOCUMENTS

2008/0031641 A1* 2/2008 Kaseno ............ B41J 11/006
399/9
2010/0013944 A1* 1/2010 Venetsky et al. ........ 348/222.1
(Continued)

FOREIGN PATENT DOCUMENTS

EP    991011 A2 *  4/2000  ........... G06K 9/00
EP    0991011 A2    4/2000

OTHER PUBLICATIONS

International Search Report and Written Opinion dated Apr. 3, 2012 for corresponding International Application No. PCT/IB2011/002821, filed Sep. 29, 2011.
(Continued)

*Primary Examiner* — Jennifer Mehmood
*Assistant Examiner* — Parul Gupta
(74) *Attorney, Agent, or Firm* — David D. Brush; Westman Champlin & Koehler, P.A.

(57) ABSTRACT

A method to provide a user interface, the method may be controlled by one or more controllers and may include one or more acts of obtaining image information from a sequence of images of a user; analyzing the image information to recognize the user; recognizing first and second reference objects at least one of which corresponding with respective body parts of the user from the image information; determining whether a first reference object has been placed over or is within a threshold scaled distance of a second reference object; calculating an interaction time between the first reference object and the second reference object when it is determined that the first reference object has been placed over or is within the threshold scaled distance of the second reference object; comparing the interaction time with a threshold reference time; and performing an action in accordance with results of the comparison.

20 Claims, 5 Drawing Sheets

(56) References Cited

U.S. PATENT DOCUMENTS

| | | | | |
|---|---|---|---|---|
| 2010/0160835 A1* | 6/2010 | Shin et al. | .................... | 600/595 |
| 2010/0281432 A1* | 11/2010 | Geisner | .................. | G06F 3/011 |
| | | | | 715/849 |
| 2010/0306712 A1* | 12/2010 | Snook | ..................... | G06F 3/017 |
| | | | | 715/863 |
| 2011/0187655 A1* | 8/2011 | Min | ...................... | G06F 1/1643 |
| | | | | 345/173 |
| 2013/0332166 A1* | 12/2013 | Higashi | .................. | G10L 15/00 |
| | | | | 704/246 |

OTHER PUBLICATIONS

Kang-Hyun Jo et al., "Manipulative Hand Gesture Recognition Using Task Knowledge for Human Computer Interaction" Automatic Face and Gesture Recognition, 1998. Proceedings. Third IEEE International Conference on Nata, Japan Apr. 14-16, 1998, Los Alamitos, CA, USA, IEEE Comput. Soc. US, Apr. 14, 1998 (Apr. 14, 1998), pp. 468-473 XP010277668.
Wikipedia webpage, Haar-like features, http://www.en.wikipedia.org/wiki/haar-like_features, 2016, 1 page.

\* cited by examiner

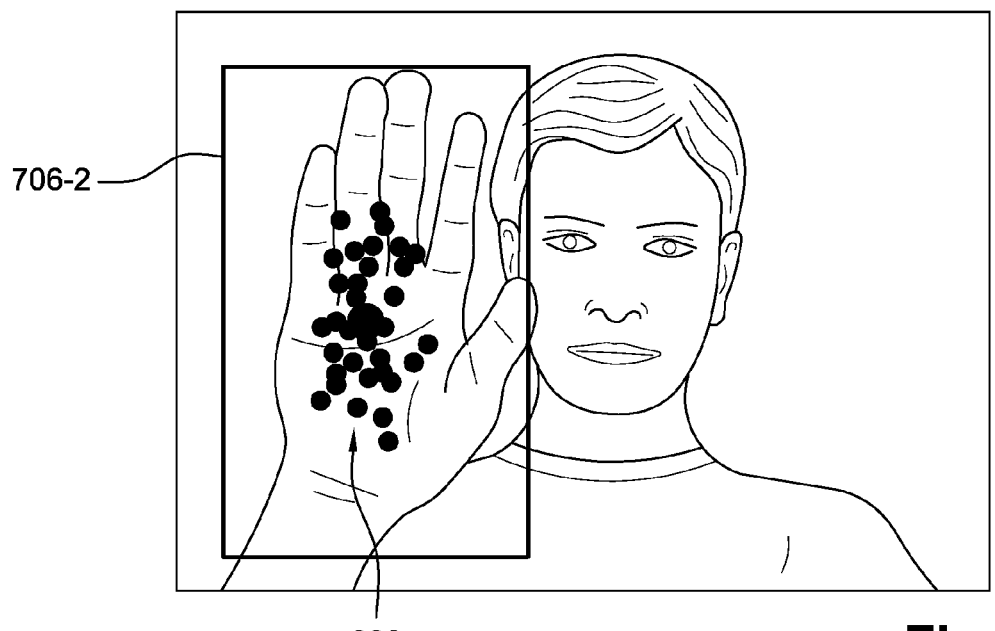
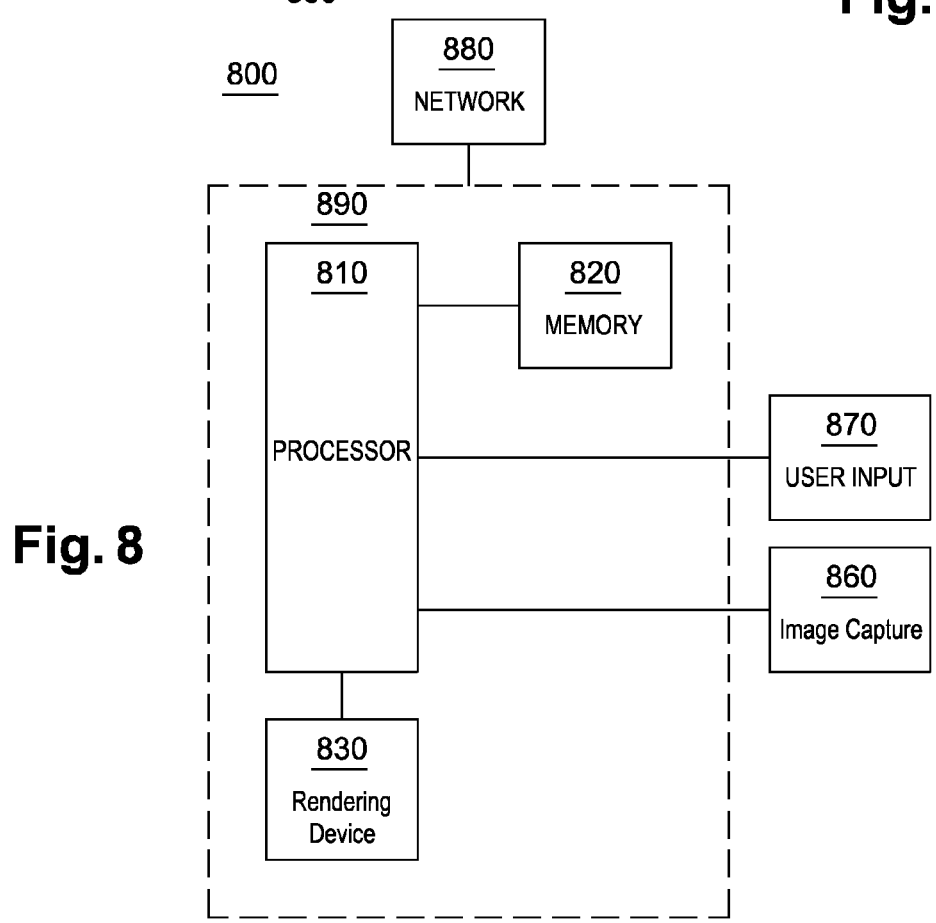

USER INTERFACE SYSTEM AND METHOD OF OPERATION THEREOF

CROSS-REFERENCE TO RELATED APPLICATIONS

This Application is a Section 371 National Stage Application of International Application No. PCT/IB2011/002821, filed Sep. 29, 2011, which is incorporated by reference in its entirety and published as WO 2012/042390 on Apr. 5, 2012, in English, which claims the benefit of U.S. Provisional Application No. 61/388,515, filed Sep. 30, 2010, which is incorporated by reference in its entirety.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE PRESENT SYSTEM

The present system relates generally to user interface system, and more specifically, to a user interface (UI) which may recognize body parts using gestures of a user.

BACKGROUND OF THE PRESENT SYSTEM

Recently, user stations (USs) such as mobile stations (MSs), cellular phones, mobile phones (e.g., IPHONE™), personal digital assistants (PDAs), Blackberry™-type devices, netbooks, laptops, pad-type computing devices (e.g., IPAD™), personal computers (PCs), desktop computers, TVs and the like have begun to incorporate image capture devices such as cameras to capture image information. However, to reduce size and/or weight they do not have conventional user input devices such as hard-key keyboards with which a user may easily interact with the US. Accordingly, a user may interact with these devices via a touch-screen display which may provide a soft-keyboard. However, this requires a user to be within an arm's length of the display which may be inconvenient to the user.

SUMMARY OF THE PRESENT SYSTEM

One or more systems, methods, apparatus, and/or computer programs (hereinafter, for the sake of clarity, each of which will be referred to as system or systems unless the context indicates otherwise) which provide a gesture-based user interface (UI) is disclosed. The present system may interact with the user in a personal and/or enterprise environment. Thus, a user may interact with the present system via a user station (US) such as pad-type computing device, and/or via an enterprise system such as in a store, an institution (e.g., a school), a public space (e.g., an airport, etc.), a government agency (e.g., department of motor vehicles, etc.), etc. Further, the system may discern between two or more user's who may interact with the system at the same time. Thus, operative acts of the present system may be performed in a simultaneous or parallel manner for one or more users. Further, depending upon a user's gestures between two or more body parts over time, the system may select and/or display advertising content for a user's convenience.

In accordance with aspect of the present system, there is disclosed a user interface (UI) method, the UI controlled by one or more controllers. The UI method may include one or more acts of obtaining image information from a sequence of images of a user; analyzing the image information to recognize the user; recognizing first and second reference objects corresponding with respective body parts of the user from the image information; determining whether a first reference object has been placed over or is within a threshold scaled distance of a second reference object; calculating an interaction time (Ti) between the first reference object and the second reference object when it is determined that the first reference object has been placed over or is within the threshold scaled distance of the second reference object; comparing the interaction time with a threshold reference time (Trt); and performing an action in accordance with results of the comparison.

The method may further include an act of registering the first and second reference objects and a corresponding association between the first and second reference objects. Further, the act of recognizing may be performed using an object recognition technique. Moreover, the act of recognizing may further include an act of determining one or more regions of interest (ROIs) within the image.

It is also envisioned that the method may include an act of determining the action based upon the relationship between the first and second reference objects. Further, the act of performing the action may include one or more acts of highlighting and rendering the second reference object, callingan application, thereby running specific processing code, running a snipped of code, inputting a command and other operations of the like.

There is also provided a user interface (UI) system, the UI communication system including one or more controllers which may obtain image information from a sequence of images of a user; analyze the image information to recognize the user; recognize first and second reference objects, one or more of which corresponding with respective body parts of the user from the image information; determine whether the first reference object has been placed over or is within a threshold distance of the second reference object; calculate an interaction time (Ti) between the first reference object and the second reference object when it is determined that the first reference object has been placed over or within a threshold distance of the second reference object; compare the interaction time with a threshold reference time (Trt); and/or perform an action based upon the results of the comparison.

The one or more controllers may register the first and second reference objects and a corresponding association between the first and second reference objects. Further, the one or more controllers may recognize the first and second reference objects one or more of which corresponding with respective body parts of the user in accordance with an object recognition technique. Moreover, to recognize the first and second reference objects the one or more controllers may determine one or more regions of interest (ROIs) within the image. Further, the one or more controllers may determine the action based upon the relationship between the first and second reference objects. It is also envisioned that the one or more controllers may highlight and render (e.g., on a user interface of the system such as a display screen) the second reference object, call an application, or input a command in accordance with the action.

There is also disclosed a computer program stored on a computer readable memory medium, the computer program configured to provide a user interface (UI), the computer program may include a program portion configured to obtain image information from a sequence of images of a user such as image information from a device such as a camera, from a persistent memory, etc; analyze the image information to recognize the user; recognize first and second reference objects one or more of which corresponding with respective body parts of the user from the image information; determine whether the first reference object has been placed over or is within a threshold distance of the second reference object; calculate an interaction time (Ti) between the first reference object and the second reference object when it is determined that the first reference object has been placed over or within a threshold distance of the second reference object; compare the interaction time with a threshold reference time (Trt); and/or perform an action based upon the results of the comparison.

Further, according to the computer program the program portion may be configured to register the first and second reference objects and a corresponding association between the first and second reference objects. Moreover, the program portion may be further configured to recognize the first and second reference objects one or more of which corresponding with respective body parts of the user in accordance with an object recognition technique. Further, to recognize the first and second reference objects, the program portion may be configured to determine one or more regions of interest (ROIs) within the image.

It is also envisioned that the program portion may be configured to determine the action based upon the relationship between the first and second reference objects. It is also envisioned that the program portion may be configured to highlight and render the second reference object, call an application, and/or input a command in accordance with the action.

BRIEF DESCRIPTION OF THE DRAWINGS

The invention is explained in further detail, and by way of example, with reference to the accompanying drawings wherein:

FIG. 7 shows a screen shot which illustrates a method to normalize a center location of the hand in accordance with embodiments of the present system; and FIG. 8 shows a portion of a system 800 (e.g., peer, server, user station, etc.) in accordance with embodiments of the present system.

DETAILED DESCRIPTION OF THE PRESENT SYSTEM

Figure 1:
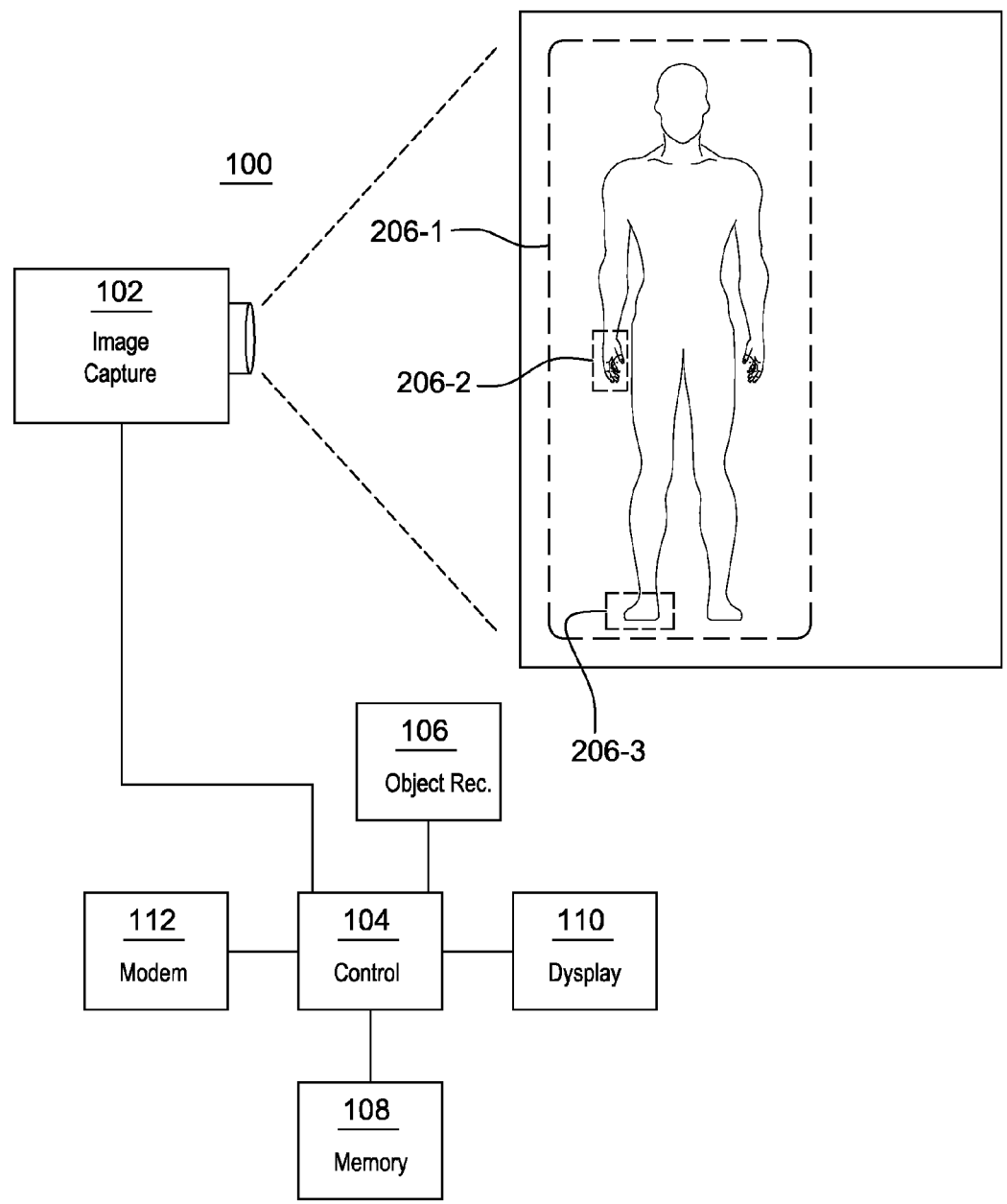
FIG. 1 shows a block diagram of an imaging system in accordance with embodiments of the present system.

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well known devices, circuits, tools, techniques and methods are omitted so as not to obscure the description of the present system. It should be expressly understood that the drawings are included for illustrative purposes and do not represent the scope of the present system. In the accompanying drawings, like reference numbers in different drawings may designate similar elements.

For purposes of simplifying a description of the present system, the terms "operatively coupled", "coupled" and formatives thereof as utilized herein refer to a connection between devices and/or portions thereof that enables operation in accordance with the present system. For example, an operative coupling may include one or more of a wired connection and/or a wireless connection between two or more devices that enables a one and/or two-way communication path between the devices and/or portions thereof. For example, an operative coupling may include a wired and/or a wireless coupling to enable communication between a controller and one or more user devices.

The term rendering and formatives thereof as utilized herein refer to providing content, such as digital media which may include, for example, audio information, visual information, audiovisual information, etc., such that it may be perceived by at least one user sense, such as a sense of sight and/or a sense of hearing. For example, the present system may render a user interface (UI) on a display device so that it may be seen and interacted with by a user. Further, the present system may render audio visual content on both of a device that renders audible output (e.g., a speaker, such as a loudspeaker) and a device that renders visual output (e.g., a display). To simplify the following discussion, the term content and formatives thereof will be utilized and should be understood to include audio content, visual content, audio visual content, textual content and/or other content types, unless a particular content type is specifically intended, as may be readily appreciated.

The user interaction with and manipulation of the computer environment may be achieved using any of a variety of types of human-processor interface devices that are operationally coupled to a processor (e.g., a controller) or processors controlling the displayed environment such as a gesture recognition system. The gesture recognition system may operate alone or in accordance with a user interface (UI) such as a graphical user interface (GUI) which may be rendered on a display of the system. For example, a user may use certain gestures in relation to a planar workspace to manipulate a visual object, such as a cursor, depicted on a two-dimensional display surface in a direct or indirect mapping between the position of the user manipulation and the depicted position of the cursor. This is typically known as position control, where the motion of the depicted object may correlate to motions and/or gestures of the user over time.

A system configured to recognize various body parts using image recognition methods in accordance with embodiments of the present system will now be discussed in further detail. In accordance with embodiments of the present system, after identifying a first reference object (e.g., a first body part such as a right hand of a user), the system may identify the relationship of other reference objects (e.g., other body parts of the user) relative to the first body part (e.g., the hand) over time. Accordingly, the present system may identify, for example, a right hand of a user and may determine body parts associated with the right hand of the user over a given interval of time.

FIG. 1 shows a block diagram of an imaging system 100 in accordance with embodiments of the present system. The imaging system 100 may include one or more of an image capture portion 102, a control portion 104, an object recognition portion 106, a memory portion 108, and a display portion 110 each of which may be separate from, or combined with, each other. Further, each of the portions 102-112 may be operative coupled locally or remotely from each other. Accordingly, each of portions 102-112 may communicate with other portions 102-112 via, for example, a wired or wireless network.

The image capture portion 102 may include any suitable image capture device such as, for example, a camera, a video camera, a heat capture device, depth capture device, motion capture device, body sensing device, etc. Accordingly, the image capture portion 102 may capture still images, video images, etc., as raw image information which may be processed further to form image information. The image capture portion 102 may comprise a web camera which may transmit raw image information or image information to the control portion 104. The image capture portion 102 may include a web camera which may be operatively coupled to the control portion 104.

The control portion 104 may control the overall operation of the imaging system 100. Accordingly, the control portion 104 may include one or more processors, logic devices, controllers, application specific integrated circuits (ASICs), etc. which may process information, transmit and/or receive information (e.g., raw image information, image information, control and/or command information, etc.) as described further herein.

The object recognition portion 106 may include a digital signal processor (DSP) which may process the raw image information in accordance with one or more algorithms of the present system. The algorithms may be part of, for example, one or more image processing applications such as an Intel™ OpenCV™ application. The object recognition portion 106 may include hard (e.g., hardware) and/or soft (e.g., software) processing portions. The object recognition portion 106 may receive the raw image information from the image capture portion 102 and may process raw image information or image information to form object recognition information (ORI) in accordance with one or more object recognition methods such as a HaarCascades-type method and which may be stored in a memory of the system 100 such as the memory 108.

The memory 108 may include any suitable memory portion in which various information of the present system 100 may be stored. Accordingly, the memory 108 may include a persistent memory which may store raw image information, image information, ORI, data generated by the system 100, user information (e.g., user account information, registration information, etc.), operating programs or applications of the present system, and/or other information necessary for the system 100 to operate properly. The memory 108 may include portions which are located locally and/or remotely from each other. Accordingly, the memory 108 may include a surface area network (SAN) or the like. Moreover, the memory 108 may be accessible over a network.

The display portion 110 may include any suitable display which may render (e.g., display) content and/or other information for the convenience of a user. Accordingly, the display 110 may include a liquid crystal display (LCD), a light emitting diode (LED) display, a cathode ray tube (CRT) display, an electrophoretic (EA) display, etc., which may display content, etc., for the convenience of the user. The display portion 110 may include a touch screen display with which a user may interact to directly enter information into the system 100.

The system 100 may also include a speaker to output content such as audio content for the convenience of the user and/or a microphone to receive audio information. The speaker and/or microphone may operate under the control of the control portion 104.

The modem portion 112 may comprise a wired and/or wireless modem which may transmit and/or receive information such as content, raw image information, image information, etc., using any suitable protocol. Accordingly, the modem 112 may be configured to upconvert information for transmission via a wired and/or wireless link (e.g., using an antenna, etc.) and may downconvert information received and send the downconverted information to the control portion 104.

Figure 2:
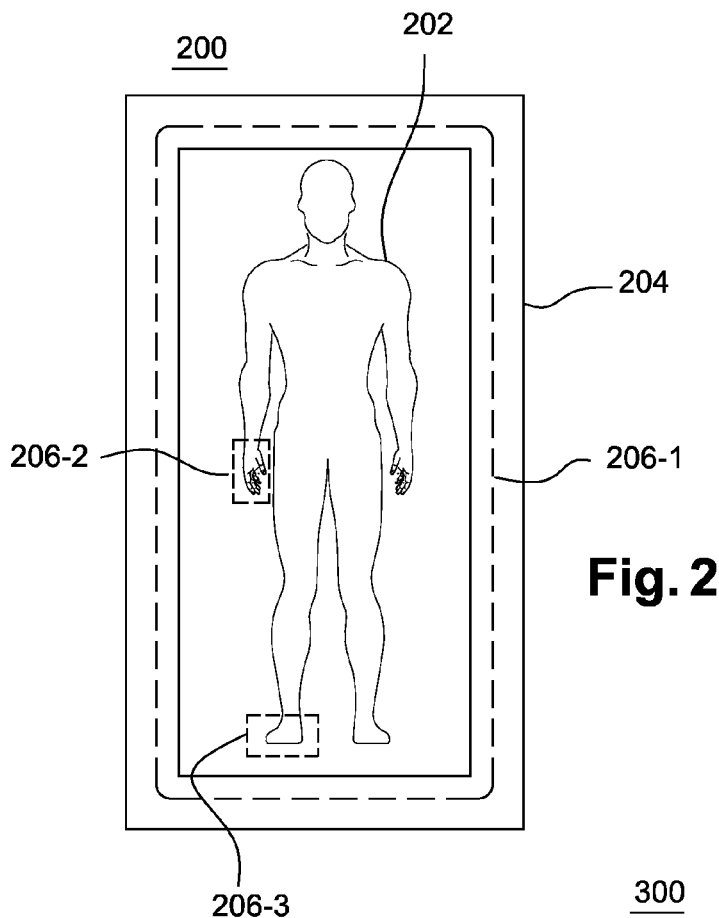
FIG. 2 shows a screen shot of an image of an individual captured in accordance with embodiments of the present system.

FIG. 2 shows a screen shot of an image 200 of an individual (e.g., a user) captured in accordance with embodiments of the present system. The image 200 is captured by an image capture portion (e.g., portion 102, etc.) and processed by an object recognition portion (e.g., see, portion 106) which may process the image 200 using one or more object recognition methods such as an OpenCV™ application, a HaarCascades method (technique), a DSP method, etc., to identify relevant portions of the image 200 in accordance with embodiments of the present system. The system may use an object recognition application such as, the OpenCV framework to process the image information and determine one or more regions of interest (ROIs) within the image information. Each ROI may correspond with a region such as a rectangular region, circular region or other shaped region of interest (ROI) and combinations thereof. Rectangular shaped regions are illustratively described below and are illustrated by frames 206-x however the claims should be understood to encompass other shaped regions unless specifically stated therein. Accordingly, after determining an ROI illustratively corresponding with a body 202 of the user, the present system may frame this ROI with a frame 206-1. Similarly, after determining ROIs corresponding with a hand and a foot of a user, the system may frame these regions with frames 206-2 and 206-3, respectively.

In the present example, the ROIs set forth by frames 206-x may correspond with regions such as the rectangular regions in accordance with a HaarCascade method and are illustrated by frames 206-1 through 206-3 (generally 206-x) which may, be at any position and/or scale within the image 200 and may, for example, correspond with a body, a right hand region, and a right foot region, respectively, in the present example. However, other regions such as rectangular regions and/or combinations thereof are also envisioned. In accordance with embodiments of the present system, the system may find all regions within an image or sequence of images. Further, in accordance with embodiments of the present system regions may be located within other regions. Thus, for example, the right hand and right foot rectangular regions 206-2 and 206-3, respectively, may be located within the body rectangular region 206-1. Within each rectangular region (e.g., 206-x), the object recognition portion 106 may determine various Haar-like features within the image. These Haar-like features may relate to a difference of the sum of pixels of areas inside a corresponding region (e.g., rectangular region) of the image as will be described below with reference to FIG. 7. Haar-like features are described in further detail at "en.wikipedia.org/wiki/Haar-like_eatures."

To determine a location, shape, and/or size of an ROI, the object recognition portion may compare the image information of the user with standard object information (SOI) obtained, for example, from a memory of the system. Each ROI may have corresponding HaarCascades information included in, for example, a corresponding extensible markup language (XML) file or other storage format. For example, a sample HaarCascade XML description of a hand is available on the Internet at Internet address nuicode.com/projects/gsoc-ccv-hand/repository/revisions/44/entry/Final/haarcascade.xml as an XML file. Similar XML files may be generated for each of the body parts that is illustrated in the present system. Accordingly, in the present example, the SOI may include information which may define anatomical regions of a standard body such as, a hand, a right shoulder, a right elbow, a right thigh, a right knee, a right foot, an abdomen, a left shoulder, a left elbow, a left thigh, a left knee, a left foot, reference object (e.g., ruler), etc., and corresponding first through fourth regions, such as quadrants. The system may obtain the HaarCascades information and identify regions which include desired body and/or parts thereof. Thus, when the present system obtains an image sequence of a user, it may determine various information such as ROIs, first through fourth quadrants, various anatomical/body parts of the user in these regions, an interaction of objects such as at least one defined body parts (i.e., first and second reference objects) of the user (e.g., user right hand or other indicating object such as a ruler, placed upon right thigh, etc.), etc., in accordance with the HaarCascades information, and a duration of interaction between the first and second reference objects, such as defined body parts (e.g., an interaction time (Ti)). The system may then, use this information (e.g., the interaction of the defined body parts and/or Ti) to determine one or more actions (e.g., page up, enter, application calls, etc.) in accordance with determined interaction and/or duration. It is also envisioned that information related to the interaction (e.g., right hand placed on right thigh) and/or duration of interaction (e.g., 10 seconds) may be output to other applications for further processing.

Figure 3:
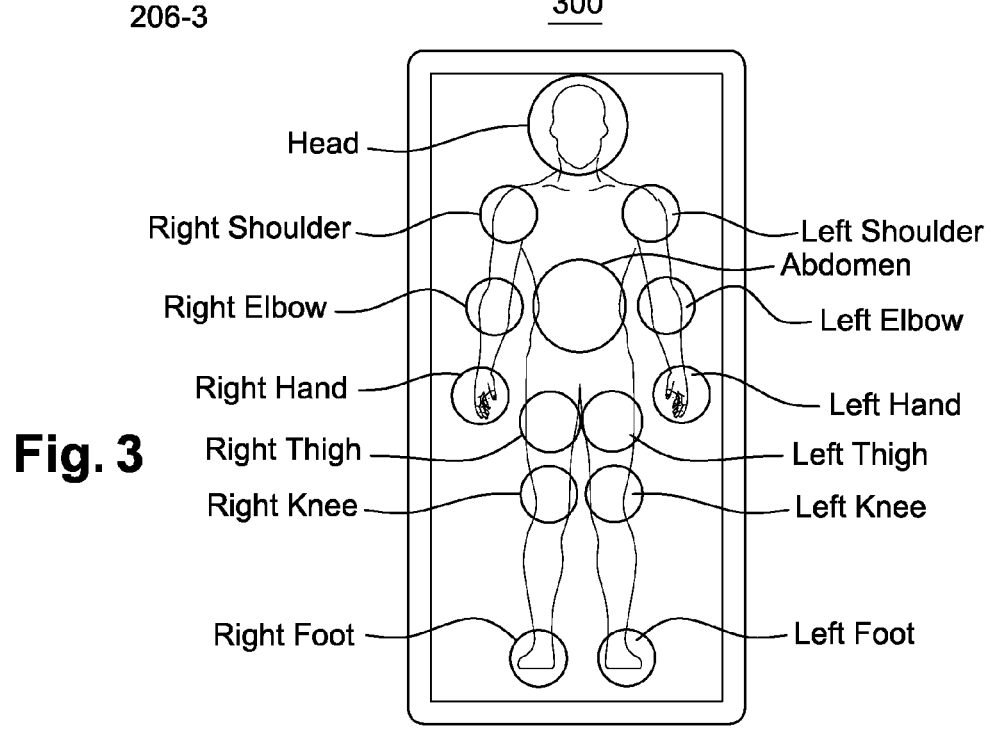
FIG. 3 shows an image rendered using standard object information (SOI) in accordance with embodiments of the present system.

FIG. 3 shows an image 300 rendered using SOI in accordance with embodiments of the present system. Each of the circled areas of the image 300 may illustrate a standard object (e.g., a right hand, a left knee, etc.) corresponding with a predefined body part or other object and may be mapped to a human body on a one-to-one basis. The SOI may include images which may match a user such as a sitting image, a standing image, a running image, etc., such that the system may easily match image information of a user (e.g., captured via a web cam) with the corresponding SOI (e.g., sitting user may be matched with a sitting SOI file) such that the system may efficiently map the image information of the user with the SOI on, for example, a one-to-one basis.

Referring to FIGS. 2 and 3, the system may identify one or more parts of a body (e.g., one or more anatomical features) of a user in a sequence of captured images by determining one or more ROIs and corresponding rectangular regions and comparing these one or more rectangular regions with corresponding SOI information on a one-to-one basis to determine locations of standard objects (e.g., standardized anatomical features) and/or relationships between these standard objects as will be described below. Thus, the object recognition portion may compare on a one-to-one basis a portion of image 200 in which a rectangular Haar is recognized such as rectangular regions (206-x) of the image 200 with SOI such as shown in FIG. 3, and may recognize one or more parts of a body of the user (e.g., a right hand, a left foot, an abdomen, etc.) and/or locations of these body parts of the user based upon the comparison. The object recognition portion may repeat this process for each portion or rectangular region of the image information of the image sequence.

Further, the object recognition portion may perform a recognition process for various anatomical features (e.g., facial features, head, abdomen, right hand, right foot, etc.) of one or more bodies in the image. Thus, if several bodies are in an image, the object recognition portion may distinguish each body and may then distinguish anatomical features of each body. Then, the process may match these features with the SOI so as to recognize standard objects (e.g., head, abdomen, right hand, left foot, etc.). Accordingly, the process may automatically identify and/or verify a person from a digital image using, for example facial features to identify the person. The object recognition portion may process the image 200 using any suitable method (e.g., using a Haar classifier, imaging applications, etc.) to identify a user, anatomical features of the user, and an interaction between reference objects, such as the anatomical features of the user.

To conserve resources, the SOI may be stored in different databases. For example, facial information may be stored in a facial SOI database while general body information may be stored in a body SOI database. For example, an image or image sequence may be captured of a user placing his or her hand over one or more parts of the user's body. In accordance with embodiments of the present system, the system may for example determine a center location of a rectangular Haar, associate the center location of the rectangular Haar with the whole body, and/or render an image of the user or a general image of body, and/or highlight the area of the body upon which the user placed his or her hand. The highlighted area may then be compared to SOI which may denote an actual body part name corresponding with the highlighted area. Accordingly, is the SOI may include a predefined structure of a body with corresponding names of body parts.

Figure 4:
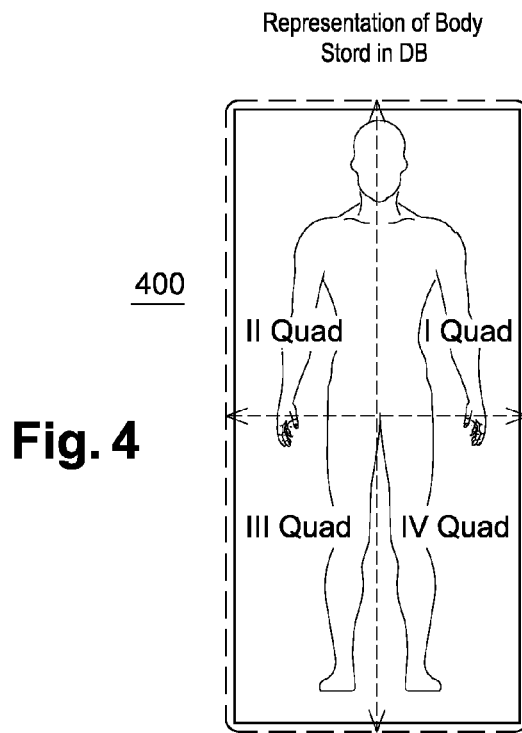
FIG. 4 shows an image rendered using standard object information (SOI) in accordance with embodiments of the present system.
Figure 5:
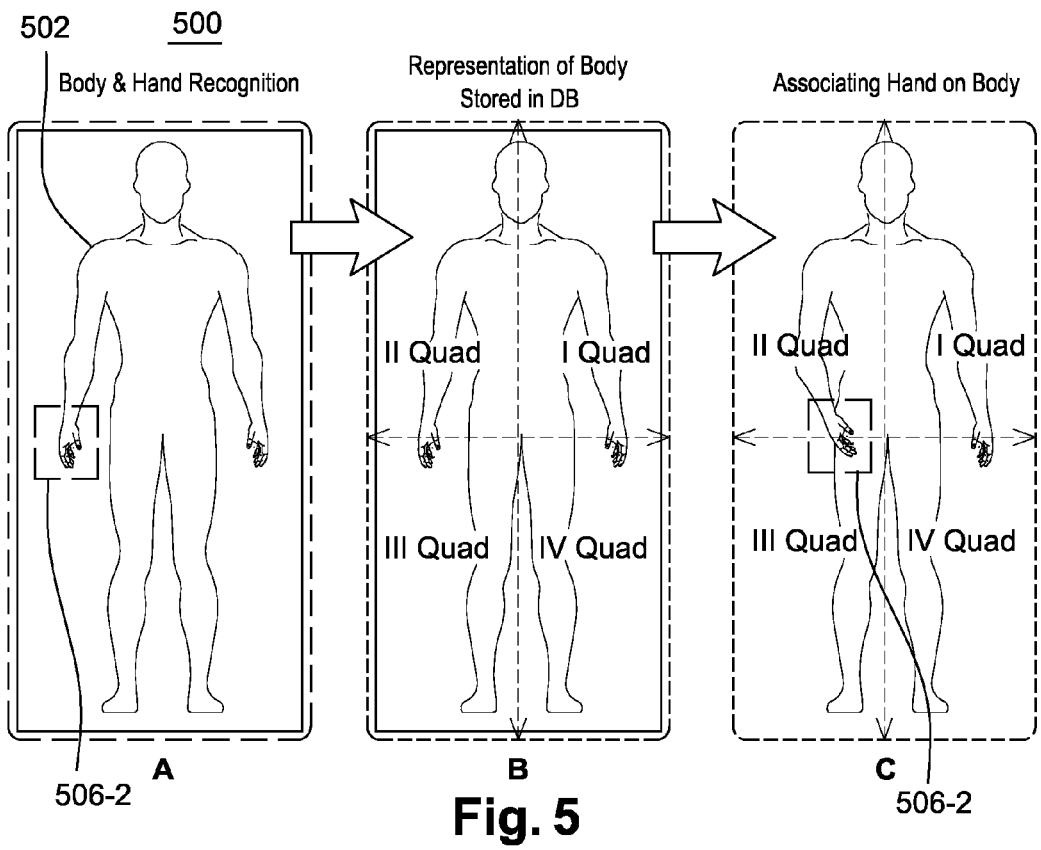
FIG. 5 shows an image sequence showing a process of associating a hand with a region of a body in accordance with embodiments of the present system.

FIG. 4 shows an image 400 rendered using SOI in accordance with embodiments of the present system. The SOI may further define areas such as first through fourth regions as shown. In accordance with embodiments of the present system, the size and shape of these regions may depend on factors such as closeness of a body to the camera, number of body parts that need to be recognized, and the specific type of person or body shape in the image. Accordingly, the system may detect when a user has placed a selected anatomical feature such as a right hand upon a part of the body corresponding with one or more of the defined first through fourth regions such as quadrants, and may determine a closest body part (e.g., a body part within a threshold distance) to the location where the hand of the user has been placed and a duration of time of the placement. Thus, for example, if it is determined that the user has placed his or her right hand upon a part of the body corresponding with the first quadrant for a period of time equal to or exceeding a first threshold time, the process may determine one or more actions (e.g., page up, enter, etc.) in accordance with determined interaction and/or duration. By dividing the body into regions, it becomes easier to determine closest body parts since only body parts that are contained within the identified region need be searched during the identifying act as described further herein FIG. 5 shows an image sequence showing a process of associating a right hand with a region of a body 502 in accordance with embodiments of the present system. In image A the process may detect a rectangular Haar 506-2, may determine a center location of this Haar and may associate the center location of the rectangular Haar 506-2 with the body 502 in real time. The system may obtain SOI illustrating a mapping of a body which illustrates first through fourth quads as shown in image B. Then, assuming that the right hand of the user is placed over a region of the body corresponding with the third quadrant as illustrated in image C (which is a subsequently captured image of the user), the system may compare a location of the right hand of the user with the SOI of image B and determine a closest body part of the user. Then, the system may determine an interaction time (Ti) between the right hand and the determined closest body part and execute an appropriate action based upon the detected interacting body parts and the Ti as will be described below with reference to Table 1.

Further, it is envisioned that the system may track interaction of a sequence of body parts over various times. For example, left hand on right shoulder for 3 seconds and thereafter on right thigh for 10 seconds or more, etc. Accordingly, when the system detects a sequence of interactions of body parts (or parts in relation to regions) over time, the system may determine one or more actions (e.g., backspace, page up, etc.) in accordance with determined sequence of interactions and/or corresponding durations. In accordance with embodiments of the present system, these sequences may also be stored in a memory such as a database (DB) for further processing and analysis later and may be associated with calling/running an application, highlighting an image, etc., based on these stored sequence of interactions.

Figure 6:
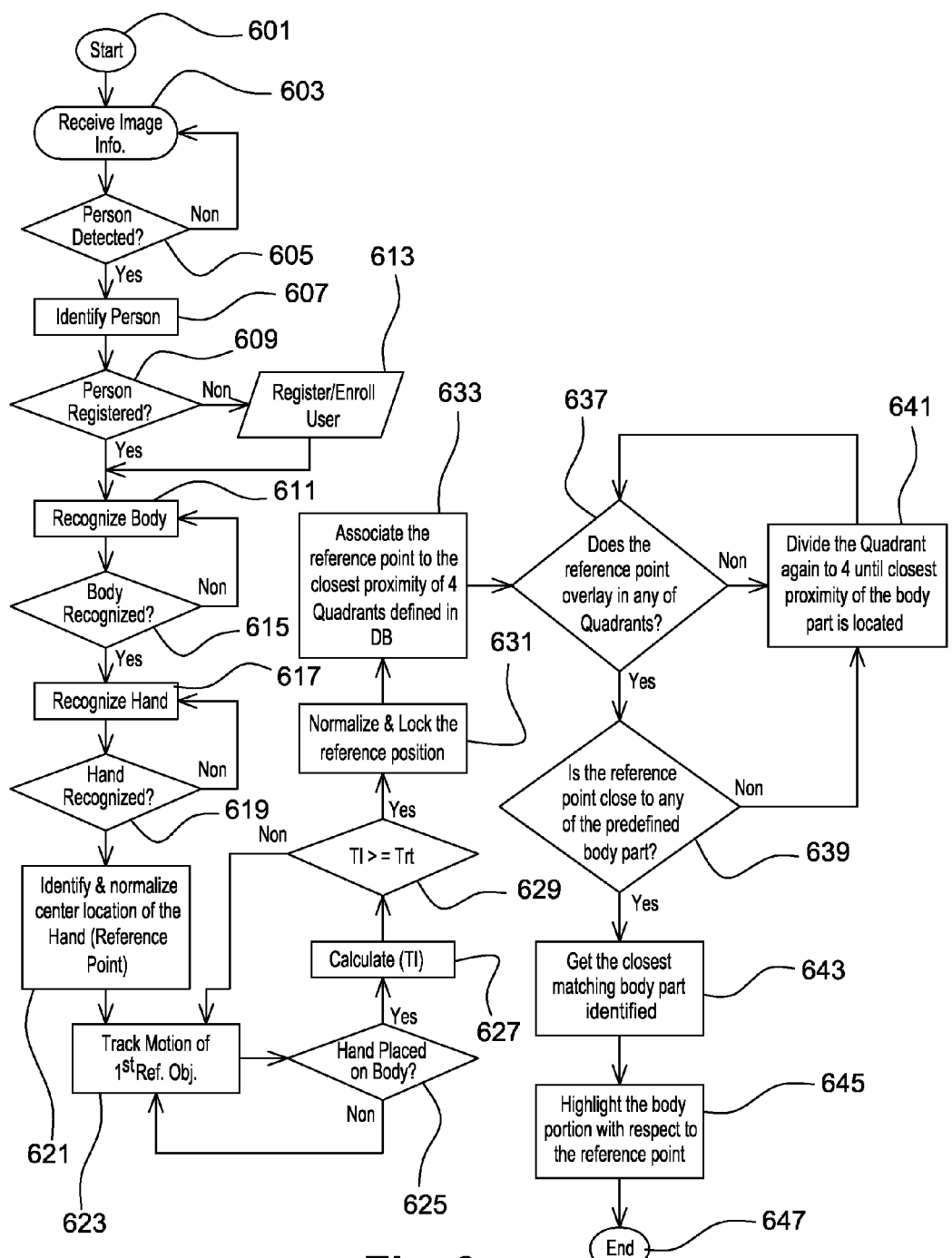
FIG. 6 shows a flow diagram that illustrates a process in accordance with embodiments of the present system.

A process illustrating one or more operations performed by, for example, an index portion (and/or other portions) of the present system is illustrated below with reference to FIG. 6 which shows a flow diagram that illustrates a process 600 in accordance with embodiments of the present system. The process 600 may be performed using one or more computers communicating over a network. The process 600 may include one of more of the following acts. Further, one or more of these acts may be combined and/or separated into sub-acts, if desired. The image processing acts of the process may be performed using a suitable image processing method such as a Haars Cascade type method using a suitable image processing application (e.g., an Intel OpenCV™ application or the like) in accordance with the present system. In operation, the process may start during act 601 and then proceed to act 603.

During act 603, the process may receive image information (e.g., corresponding with an image sequence of a user) from an image capture device such as a web camera. After performing act 603, the process may continue to act 605. During act 605, the process may determine whether a person (e.g., a user) or other predetermined object is detected in the image information. In detecting whether a person is detected in the image information, a system in accordance with embodiments of the present system may identify a body (e.g., a whole body) or a body portion (e.g., such as an upper torso) as may be readily appreciated. Accordingly, if the process determines that a person is detected, the process may continue to act 607. However, if the process determines that a person is not detected, the process may repeat acts 603, 605. The process may detect the person by, for example, processing the image information and determining when a person is detected in the image information. Thus, when a person walks in front of a web camera, the process may determine that the person is detected in an image.

During act 607, the process may identify the person. Accordingly, for example, the process may perform a biometric/body recognition process such as a facial and/or other another body recognition process on the image information so as to form identification information which may be used to identify the person. After performing act 607, the process may continue to act 609. During act 609, the process may determine whether the person is a registered person (e.g., is registered in a database of the system). Accordingly, if it is determined that the person is a registered person, the process may continue to act 611. However, if it is determined that the person is not a registered person, the process may continue to act 613.

In accordance with embodiments of the present system, the process may determine whether the person is a registered person based upon results of a comparison of the identification information (e.g., from act 607) and registered person identification (RPI) information (e.g., obtained from a memory of the system). Accordingly, the process may determine the person is a registered person when the results of the comparison indicate that the identification information corresponds with the RPI information. The RPI may include, for example, information related to biometric information such as SOI, reference objects associated with the body (e.g., hand, foot, thigh, etc.), associated reference object associations (e.g., right hand on left thigh, ruler on left thigh, etc.) and/or associated threshold reference times (e.g., duration, such as 3 seconds, etc.) as illustrated in a reference object association table (ROAT) as illustrated in Table 1 below.

TABLE 1

ROAT TABLE

| Object 1 | RH | RS | RE | RT | RK | RF | LH | LS | LE | LT | LK | LF | UD1 |
|---|---|---|---|---|---|---|---|---|---|---|---|---|---|
| | | | | | Object 2/BODY part | | | | | | | | |
| Right Hand (RH) | — | — | 5s Insert | 5s Enter TD = 5 | 3s Home | 10s Shutdown | | 1s Scroll Left | 7s BackSpace | 3s <select> | 4s Outlook Express ™ | 5s | 5s Zoom In |
| Right Shoulder (RS) | — | — | | | | | | | | | | | |

TABLE 1-continued

ROAT TABLE

| Object 1 | \multicolumn{13}{c}{Object 2/BODY part} |
|---|---|---|---|---|---|---|---|---|---|---|---|---|---|

| Object 1 | RH | RS | RE | RT | RK | RF | LH | LS | LE | LT | LK | LF | UD1 |
|---|---|---|---|---|---|---|---|---|---|---|---|---|---|
| Right Elbow (RE) | — | — | — | 4s Scroll UP | | | — | | | | | | |
| Right Thigh (RT) | | | | — | | | | | | | | | |
| Right Knee (RK) | | | | | — | | | | | | | | |
| Right Foot (RF) | | | | | | — | | | | | | | |
| Left Hand (LH) | 1s Scroll Right | | | 10s Scroll up 20 cm | | | — | | | | | | 5s Zoom Out |
| Left Shoulder (LS) | | | | | | | | — | | | | | |
| Left Elbow (LE) | | | | 3s Play Slow Mode TD = 8 | | | 1s F5 | | — | | 10s Delete | | |
| Left Thigh (LT) | | | | | | | | | | — | | | |
| Left Knee (LK) | | | | | | | | | | | — | | |
| Left Foot (LF) | | | | | | | | | | | | — | |
| User Defined 1 (Eyes or Glasses) | | | | | | | | | | | | | — |

With reference to Table 1, reference object associations may be defined between the first reference object (e.g., object 1) which may be also called a reference point and a second reference object (e.g., object 2). The system may recognize both the first and second reference objects and may track the relationship of the first reference object to the second reference object(s) using an object recognition method in accordance with the present system over time. For example, with respect to the intersection of the first reference object (e.g., right hand (RH), ruler, etc.) and the second reference object (e.g., right thigh (RT)), a threshold reference time of 5 seconds is defined and an action of "Enter" (corresponding with an keyboard enter). In other words, should the system identify that the first reference object overlaps the second reference object for 5 seconds or longer, the system through use of the ROAT identifies an action of "Enter". Similarly, with respect to the intersection of the first reference object (e.g., right hand (RH)) and the second reference object (e.g., right knee (RK)), a threshold reference time of 3 seconds is defined and an action of "Home" (corresponding with a keyboard "home" command). Further, with respect to the intersection of the first reference object (e.g., right hand (RH)) and the second reference object (e.g., left knee (LK)), a threshold reference time of 4 seconds is defined and an action of calling a mail application such as Outlook Express™. Thus, the system (e.g., through use of default relationships and commands) and/or the user may populate the reference table. The reference object associations may also include a distance threshold (e.g., see, LH-RK 20 cm scaled) which may define a threshold distance which may be used by the system to determine a closest body part (e.g., a second object) to the first reference part. Thus, the system may compare scaled actual distance with the reference distance and if it is determined that the scaled actual distance is less than or equal to the threshold distance, the system may determine that the second body part is a closest body part to the first reference object.

Further, the user and/or the system may define a sequence of reference object associations (e.g., (RH-RK (3 sec) then RH-LK (2 sec)): call Contact List Application), RH-LK (2 sec), LH-RK (10 sec): backspace), etc.). As may be readily appreciated, another timing may be similarly applied in accordance with embodiments of the present system.

Referring back to FIG. 6, during act 613 the process may perform a registration process and form RPI corresponding with the user. Accordingly, the process may interact with a user (e.g., by rendering registration information on a display of the system, etc.) to register the user. During the registration, the process may obtain biometric information from the user such as an image of a user's body, etc., which may then be normalized and included in the RPI corresponding with the user. Further, the user and/or system may set/select reference object associations (e.g., see ROAT Table 1) corresponding with the user and include this information in the RPI. However, it is also envisioned that the system may query the user to provide first and second objects, corresponding associations (e.g., LH on RK), and/or interaction times, on a one time registration basis which may then be used by the system. After completing act 613, the process may continue to act 611.

During act 611, the process may recognize a body of a user. In recognizing the body of the user, a system in accordance with embodiments of the present system may recognize a body (e.g., a whole body) or a body portion (e.g., such as an upper torso) as may be readily appreciated. Accordingly, the system may perform an object recognition process on the image information of the user to define a body rectangular region (e.g., 206-1) for a current frame (or sequence of frames over a predefined time period such as current time through previous 5 seconds). After completing act 611, the process may continue to act 615.

During act 615, the process may determine whether the body is recognized. Accordingly, if it is determined that the body is recognized, the process may continue to act 617. However, if it is determined that the body is not recognized, the process may repeat act 611. To determine whether the body is recognized, the process may compare the body rectangular region with SOI obtained from a memory of the system and determine whether they are in accord with each other. Accordingly if the body rectangular region information is in accord with the SOI, the process may determine that the body is recognized. However, if the body rectangular regions information is not in accord with the SOI, the process may determine that the body is not recognized. By repeating act 611, the process may be performed with new image information corresponding with a new current time.

During act 617, the process may perform an object recognition processes on the image information to recognize a first reference object (e.g., a right hand rectangular region in the current example) of the user. Accordingly, the process may attempt to define a hand rectangular region (e.g., 206-2) for one or more frames (or sequence of frames over a predefined time period such as current time through previous 5 seconds or other time period) of the image information. The process may do this for each defined first reference object as shown in Table 1. After completing act 617, the process may continue to act 619.

During act 619, the process may determine whether the first reference object (i.e., the right hand reference object in the current example) is recognized. Accordingly, if it is determined that the first reference object (e.g., the right hand reference object in the current example) is recognized, the process may continue to act 621. However, if it determined that the first reference object is not recognized, the process may repeat act 617. To determine whether the first reference object is recognized, the process may compare the current first reference object with the SOI and determine whether they are in accord with each other. Accordingly if process determines that the current first reference object is in accord with the SOI, the process may determine that the first reference object is recognized. However, if the process determines that the current first reference object is not in accord with the SOI, the process may determine that the first reference object is not recognized. The process may perform acts 617 through 645 for each defined first reference object (e.g., see Table 1) in a parallel or serial order.

During act 621, the process may determine and normalize a center location of the first reference object (e.g., the right hand in the present example). An image showing a normalization of a first image object in an image in accordance with embodiments of the present system is shown in FIG. 7.

In accordance with embodiments of the present system, in place of recognizing a body/hand as described above, an appropriate body part map may be retrieved that corresponds to a specified dimensions of a body as captured in the image (e.g., acts 603, etc.). In accordance with these embodiments, a predetermined set of body maps may be stored in a database (DB) in a non-transitory memory. Using body recognition and person identification, a "best fit" may be made between the captured image and a body part map stored in the DB. As may be readily appreciate, the first reference object may be an inanimate object, such as a ruler or other pointer that may be utilized in place of a first reference object such as a hand.

In any event, after completing act 621, the process may continue to act 623. During act 623, the process may track (e.g., over time) the motion of the first reference object (i.e., the right hand in the present example) relative to the body of the user and the second reference objects in the present example as shown in Table 1 then, the process may continue to act 625.

During act 625, the process may determine whether the first reference object has been placed upon the body (e.g., the second reference objects as shown in Table 1). More specifically, in the present example, the process may determine whether the right hand of the user has been placed on the body of the user. Accordingly, if the process determines that the first reference object (e.g., the right hand of the user) has been placed upon the body of the user, the process may continue to act 627. However, if it is determined that the first reference object (i.e., the right hand of the user) has not been placed upon the body of the user, the process may repeat act 623.

During act 627, the process may start a timer to determine an interaction time (Ti) which may correspond with time in which the first reference object has been placed upon the body of the user. After completing act 629, the process may continue to act 629.

During act 629, the process may determine whether Ti is greater than or equal to a corresponding threshold reference time (Trt) for the interaction of the first and second reference objects. Accordingly, if it is determined that the Ti is greater than or equal to the corresponding Trt, the process may continue to act 631. However, if it is determined that the Ti is not greater than or equal to the Trt, the process may repeat act 623.

During act 631, the process may normalize and lock the reference position. For example, a process of normalization may involve motion capture where the process of identifying the motion of a hand on a body is continuously recorded and if there is no movement of the hand on the body for a given duration that may be defined in the system, then the system may store the position of the hand on the body in the memory. In a case wherein the motion is continuous and moving, the system may wait until there is no movement of the hand. In accordance with embodiments of the present system, this functionality may be achieved using motion capturing technology such as OpenCV. After completing act 631, the process may continue to act 633. During act 633, the process may associate the location of the first reference object (e.g., corresponding to a reference point in the present example) with the closest proximity of the first through fourth regions of SOI obtained from a memory of the system. In this way, the static position of the hand on the body may be mapped and compared with the SOI that is stored in the memory. Accordingly, the process may obtain the SOI information including quadrant information such as is shown in FIG. 4, and may associate the location of the first reference object with the quadrant information. After completing act 633, the process may continue to act 637.

During act 637, the process may determine the location of the first reference object (e.g., the reference point in the present example) overlays any of the first through fourth regions in the SOI information. Accordingly, if it is determined that the location of the first reference object overlays one of the first through fourth regions, the process may continue to act 639. However, if it is determined that the location of the first reference object does not overlay one of the first through fourth regions, the process may continue to act 641.

During act 639, the process may determine whether the location of the first reference object is within a threshold distance (TD) of any predefined body part (e.g., a second reference object) that is present in the determined region (e.g., see act 637). Accordingly, if the process determines that the first reference object is within a threshold distance (TD) of any predefined body part, the process may continue to act 643. However, if it is determined that the first reference object is not within a threshold distance (TD) of any predefined body part, the process may continue to act 641. The process may determine that the first reference object is within a TD of a second reference object when, it is determined that a (scaled) distance between the first reference object and a second reference object is less than or equal to a corresponding threshold distance (TD). For example, a scaling of a reference object may be performed such that an acquired image is scaled to stored image data for determining whether the first reference object is within a TD of a second reference object. Conversely, the process may determine that the first reference object is not within a TD of the second reference object. The process may do this for every combination of first and second reference objects. The TD may include a scale distance which may be scaled to an image size of the image information and may be set/reset by the system and/or user. Further, TD may be included in Table 1 for corresponding associations of first and second reference objects (e.g., see, TD=5, where 5 which may be scaled by the system in accordance with the image information). The process may determine a scale factor based upon one or more factors such as a distance of the user from the web camera, an orientation of the user relative to the web camera, etc. The SOI may include scaled factors.

During act 641, the process may divide a current region such as a quadrant of an SOI into sub-regions until the closest proximity of the first and second reference objects are located. For example, in a case wherein the locked position (e.g., hand on body) is not closest, the present system may divide the image into sub-regions further to identify the closest location of the predefined body parts that is stored in the memory during act 637. Naturally, this process of subdividing the image may be performed repeatedly until during act 639, the reference point is found to be close to the predefined body part.

When the process determines that the first reference object is within a threshold distance (TD) of a predefined body part, during act 643, the process may set the second reference object (e.g., the second reference object determined to be within the TD of the first reference object as determined in act 639) as a closest reference object. After completing act 643, the process may continue to act 645. During act 645, the process may highlight the first reference object and/or the closest second reference object. The process may then render this information on a display of the system and/or take corresponding actions (e.g., start applications, scroll, key inputs, etc.). After completing act 645, the process may continue to act 647, wherein the process may end.

Accordingly, the present system may normalize an image sequence of a user after the image sequence is captured to produce image information of the image sequence. In the present example, a right hand of a user may correspond with a first reference object. Accordingly, recognizing the right hand of the user in the image information, the system may normalize a center location of the right hand in accordance with embodiments of the present system as illustratively shown in FIG. 7. Naturally as discussed herein, the first reference object may be an object not associated with a body part, such as a ruler or other object utilized for indicating a second reference object.

FIG. 7 shows a screen shot which illustrates a method to normalize a center location of the hand in accordance with embodiments of the present system. The system may then track the motion of the right hand relative to the body of the user as the right hand of the user may move relative to one or more positions relative to the body (e.g., relative to second reference objects such as a right hand on right thigh, etc.) using any suitable object recognition application. If it is determined that the right hand of the user has been placed upon the body of the user (e.g., a second reference object), the system may start a timer to determine a corresponding interaction time (Ti). The system may render information (e.g., on a display of the system) to inform the user to hold his or her right hand in a current position for a time which is greater than or equal to the corresponding threshold reference time (Trt) to perform some action, for the user's convenience. The system may determine a location of the right hand object relative to the body using SOI. Accordingly, the system may identify a location of the right hand relative to one or more regions of the body of the user which may correspond with first through forth regions. Thus, when a user uses his right hand to touch his right thigh (e.g., which corresponds with the third quadrant as shown in image B of FIG. 5, the system may select this area as a reference point for the internal database to compare. Since the marked area belongs to the $3^{rd}$ Quadrant, the system may associate a closest (e.g., within a certain threshold distance) body part of the user associated with this reference point. Accordingly, as the user's right thigh is determine to be the closest body part relative to the right hand of the user, the system may highlight the selected body part of the user (e.g. the right thigh) and display this information on a display of the system for the user's convenience. To increase resolution relative to a user's body, the system may further divide the regions (e.g., in first' through fourth' regions) to achieve a desired resolution. This system may perform this division process, for example, N times (e.g., 3 times) until a closest body part is identified in accordance with the closeness threshold.

FIG. 8 shows a portion of a system 800 (e.g., peer, server, user station, etc.) in accordance with embodiments of the present system. For example, a portion of the present system may include a processor 810 operationally coupled to a memory 820, a display 830, an image capture portion 860, and a user input device 880. In accordance with embodiments of the present system, the memory 820 may be any type of non-transitory storage device for storing application data as well as other data related to the described operation. The application data and other data are received by the processor 810 for configuring (e.g., programming) the processor 810 to perform operation acts in accordance with the present system. The processor 810 so configured becomes a special purpose machine particularly suited for performing in accordance with the present system.

The image capture portion 860 may include any device for capturing images or sequence of images such as a camera, a video camera, a web camera, etc. The operation acts may include capturing image data, identifying persons and body parts, etc. The user input 870 may include a keyboard, mouse, trackball or other device, including touch sensitive displays, which may be stand alone or be a part of a system, such as part of a personal computer, personal digital assistant, mobile phone, set top box, television or other device for communicating with the processor 810 via any operable link. The user input device 870 may be operable for interacting with the processor 410 including enabling interaction within a UI as described herein. Clearly the processor 810, the memory 820, display 830 and/or user input device 870 may all or partly be a portion of a computer system or other device such as a user device as described herein.

The methods of the present system are particularly suited to be carried out by a computer software program, such program containing modules (e.g., portions) corresponding to one or more of the individual steps or acts described and/or envisioned by the present system. Such program may of course be embodied in a computer-readable medium, such as an integrated chip, a peripheral device or memory, such as the memory 820 or other non-transitory memory coupled to the processor 810.

The program and/or program portions contained in the memory 820 configure the processor 810 to implement the methods, operational acts, and functions disclosed herein. The memories may be distributed, for example between the clients and/or servers, or local, and the processor 810, where additional processors may be provided, may also be distributed or may be singular. The memories may be implemented as electrical, magnetic or optical memory, or any combination of these or other types of storage devices. Moreover, the term "memory" should be construed broadly enough to encompass any information able to be read from or written to an address in an addressable space corresponding to a non-transitory memory accessible by the processor 810. With this definition, information accessible through a network is still within the memory, for instance, because the processor 810 may retrieve the information from the network for operation in accordance with the present system.

The processor 810 is operable for providing control signals and/or performing operations in response to input signals from the user input device 870 as well as in response to other devices of a network and executing instructions stored in the memory 820. The processor 810 may be an application-specific or general-use integrated circuit(s). Further, the processor 810 may be a dedicated processor for performing in accordance with the present system or may be a general-purpose processor wherein only one of many functions operates for performing in accordance with the present system. The processor 810 may operate utilizing a program portion, multiple program segments, or may be a hardware device utilizing a dedicated or multi-purpose integrated circuit.

Accordingly, the present system may recognize various objects such as anatomical features of one or more users using an object recognition method such as a Haar Cascades-type method. To identify the various objects such as bodies or body parts, the system may refer to standard object information (SOI) (e.g., stored in a SOI database or memory of the system) which may include body part information such as names of body parts (e.g., face, hair, left hand, right hand, right thigh, left thigh, etc.) and location relative to each other. The system may identify a relationship between the various identified objects (e.g., a hand and a thigh) of one or more users over a certain period of time and output this information for further processing. Then, the system may determine one or more actions (e.g., a corresponding input such as "enter," "delete," password, actions, calling one or more applications (e.g., MS. Word™, Outlook Express™, etc.), etc., associated with the determined relationship.

While the present system has been described with a reference to a gesture input system for manipulating a computer environment, it is also envisioned that user interaction with and/or manipulation of the computer environment may also be achieved using other devices such as a mouse, a trackball, a keyboard, a touch-sensitive display, a pointing device (e.g., a pen), a haptic device, etc. Further variations of the present system would readily occur to a person of ordinary skill in the art and are encompassed by the following claims.

Finally, the above-discussion is intended to be merely illustrative of the present system and should not be construed as limiting the appended claims to any particular embodiment or group of embodiments. Thus, while the present system has been described with reference to exemplary embodiments, it should also be appreciated that numerous modifications and alternative embodiments may be devised by those having ordinary skill in the art without departing from the broader and intended spirit and scope of the present system as set forth in the claims that follow. In addition, the section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

Although the present disclosure has been described with reference to one or more examples, workers skilled in the art will recognize that changes may be made in form and detail without departing from the scope of the disclosure and/or the appended claims.

What is claimed is:

1. A method of controlling a user interface by one or more controllers, the method comprising acts of:

obtaining image information from a sequence of images of a user;

analyzing the image information with the one or more controllers to recognize the body of the user;

recognizing first and second reference objects at least one of which corresponding with respective body parts of the user from the image information;
wherein the act of recognizing comprises:
  detecting that a first reference object has been placed over the body of the user when the first reference object is within a threshold scaled distance of the body of the user;
  calculating an interaction time between the first reference object and the body of the user if the one or more controllers have detected that the first reference object has been placed within the threshold scaled distance of the body of the user;
  comparing the interaction time with a threshold reference time; and
  waiting to recognize the second reference object until after determining that the interaction time exceeds the threshold reference time, said second reference object being recognized as a body part of the user which is the closest to the first reference object.

2. The method of claim 1, further comprising an act of registering the first and second reference objects and a corresponding association between the first and second reference objects.

3. The method of claim 1, wherein the act of recognizing is performed by the one or more controllers using an object recognition technique.

4. The method of claim 3, wherein the act of recognizing further comprises an act of determining one or more regions of interest within the image.

5. The method of claim 1, further comprising performing an action based on the recognized first and second reference objects.

6. The method of claim 5, further comprising an act of determining the action based upon a registered association between the first and second reference objects.

7. The method of claim 6, wherein the action comprises one or more acts of highlighting and rendering the second reference object, calling an application, and inputting a command to the one or more controllers.

8. A user interface system, the user interface system comprising:
  an input device configured to receive a sequence of images of a user; and
  one or more controllers which are configured to:
    obtain image information from the received sequence of images of the user;
    analyze the image information to recognize the body of the user;
    recognize first and second reference objects at least one of which corresponding with respective body parts of the user from the image information;
    wherein the act of recognizing comprises:
      detecting that the first reference object has been placed over the body of the user when the first reference object is within a threshold distance of the body of the user;
      calculate an interaction time between the first reference object and the body of the user if the first reference object has been detected as being within a threshold distance of the body of the user;
      compare the interaction time with a threshold reference time; and
      wait to recognize the second reference object until after the results of the comparison indicate that the interaction time exceeds the threshold reference time, said second reference object being recognized as a body part of the user which is the closest to the first reference object.

9. The system of claim 8, wherein the one or more controllers are configured to register the first and second reference objects and a corresponding association between the first and second reference objects.

10. The system of claim 8, wherein the one or more controllers are configured to recognize the first and second reference objects corresponding with respective body parts of the user in accordance with an object recognition technique.

11. The system of claim 10, wherein to recognize the first and second reference objects the one or more controllers are configured to determine one or more regions of interest within the image.

12. The system of claim 9, wherein the one or more controllers perform an action based on the recognized first and second objects.

13. The system of claim 12, wherein the one or more controllers are configured to determine the action based upon the relationship between the first and second reference objects.

14. The system of claim 8, wherein the one or more controllers are configured to highlight and render the second reference object, call an application, or input a command in accordance with the action.

15. A computer readable non-transitory memory medium comprising a computer program stored thereon, the computer program configured to provide a user interface when executed by a processor, the computer program comprising:
  a program portion which configures the processor to:
    obtain image information from a sequence of images of a user;
    analyze the image information to recognize the body of the user;
    recognize first and second reference objects at least one of which corresponding with respective body parts of the user from the image information;
    wherein the act of recognizing comprises:
      detect that the first reference object has been placed over the body of the user when the first reference object is within a threshold distance of the body of the user;
      calculate an interaction time between the first reference object and the body of the user if the first reference object has been detected as being within a threshold distance of the body of the user;
      compare the interaction time with a threshold reference time; and
      wait to recognize the second reference object until after the results of the comparison indicate the interaction time exceeds the threshold reference time, said second reference object being recognized as a body part of the user which is the closest to the first reference object.

16. The computer program of claim 15, wherein the program portion is further configured to register the first and second reference objects and a corresponding association between the first and second reference objects.

17. The computer program of claim 15, wherein the program portion is further configured to recognize the first and second reference objects in accordance with an object recognition technique.

18. The computer program of claim 16, wherein to recognize the first and second reference objects, the program portion is further configured to determine one or more regions of interest within the image.

19. The computer program of claim 15, wherein the program portion is further configured to determine an action based upon the relationship between the first and second reference objects.

20. The computer program of claim 15, wherein the program portion is further configured to highlight and render the second reference object, call an application, or input a command in accordance with the action.

* * * * *